US012568524B2

(12) United States Patent He

(10) Patent No.: US 12,568,524 B2
(45) Date of Patent: Mar. 3, 2026

(54) RANDOM ACCESS METHOD, AND ELECTRONIC DEVICE AND STORAGE MEDIUM

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 314 days.

(21) Appl. No.: 18/215,659

(22) Filed: Jun. 28, 2023

(65) Prior Publication Data

US 2023/0345525 A1     Oct. 26, 2023

Related U.S. Application Data

(63) Continuation of application No. PCT/CN2020/141746, filed on Dec. 30, 2020.

(51) Int. Cl.
*H04W 74/00*      (2009.01)
*H04L 1/18*       (2023.01)
*H04W 74/0833*    (2024.01)

(52) U.S. Cl.
CPC ............. *H04W 74/004* (2013.01); *H04L 1/18* (2013.01); *H04W 74/002* (2013.01); *H04W 74/0833* (2013.01)

(58) Field of Classification Search
CPC ............. H04W 74/004; H04W 74/002; H04W 74/0833; H04W 56/001; H04W 74/0808; H04L 1/18; H04L 1/1887; H04L 1/1896; H04L 1/189
See application file for complete search history.

(56) References Cited

U.S. PATENT DOCUMENTS

| | | | | |
|---|---|---|---|---|
| 2016/0278124 A1* | 9/2016 | Zhao | ..................... | H04W 74/08 |
| 2020/0008240 A1* | 1/2020 | Golitschek Edler von Elbwart ... | | H04W 72/0446 |
| 2020/0170045 A1* | 5/2020 | Lee | ................... | H04W 74/0833 |
| 2021/0076384 A1* | 3/2021 | MolavianJazi | ....... | H04L 5/0094 |
| 2021/0378017 A1* | 12/2021 | Luo | ........................ | H04L 5/0044 |
| 2022/0369364 A1* | 11/2022 | Taherzadeh Boroujeni | ................ | H04L 1/1829 |
| 2023/0345525 A1* | 10/2023 | He | .......................... | H04L 1/189 |
| 2024/0365401 A1* | 10/2024 | Hu | ................... | H04W 74/0833 |
| 2025/0024508 A1* | 1/2025 | Xu | ....................... | H04W 74/004 |
| 2025/0081251 A1* | 3/2025 | Shi | ................... | H04W 52/0216 |

FOREIGN PATENT DOCUMENTS

| | | |
|---|---|---|
| CN | 102448181 A | 5/2012 |
| CN | 104581925 A | 4/2015 |
| EP | 3500038 A1 | 6/2019 |

(Continued)

OTHER PUBLICATIONS

Extended European Search Report issued in corresponding European application No. 20967617.0, mailed Feb. 1, 2024.

(Continued)

*Primary Examiner* — Ivan O Latorre

(74) *Attorney, Agent, or Firm* — BAYES PLLC

(57) ABSTRACT

Disclosed is a random access method. The method includes: determining, by a terminal device, a starting time moment of a contention resolution timer according to a time of Msg3 transmission repetitions.

20 Claims, 10 Drawing Sheets

(56)              References Cited

FOREIGN PATENT DOCUMENTS

| EP | 3813470 A1 | 4/2021 |
| WO | 2019214650 A1 | 11/2019 |

OTHER PUBLICATIONS

Source: Samsung; Title: Contention Resolution Timer Handling in NR-U 3GPP TSG-RAN2 107 R2-1908795 Prague, Czech Republic, Aug. 26-Aug. 30, 2019.

Philips et al., "Control of HARQ for RACH message 3", Tdoc R2-081764, 3GPP TSG-RAN WG2#61bis Shenzhen, China, Mar. 31-Apr. 4, 2008.

International Search Report issued in international application No. PCT/CN2020/141746, mailed Sep. 15, 2021.

Written Opinion of the International Searching Authority issued in international application No. PCT/CN2020/141746, mailed Sep. 15, 2021.

3GPP TS 38.213 V16.2.0 (Jun. 2020); Technical Specification Group Radio Access Network; NR; Physical layer procedures for control (Release 16).

3GPP TS 38.321 V16.1.0 (Jul. 2020); Technical Specification Group Radio Access Network; NR; Medium Access Control (MAC) protocol specification (Release 16).

* cited by examiner

100

Determine, by a terminal device, a starting time moment of a contention resolution timer according to a time of Msg3 transmission repetitions — S201

Determine, by a terminal device, a starting time moment of a RAR time window according to a random access occasion corresponding to Msg1 transmission repetitions   S301

FIG. 10

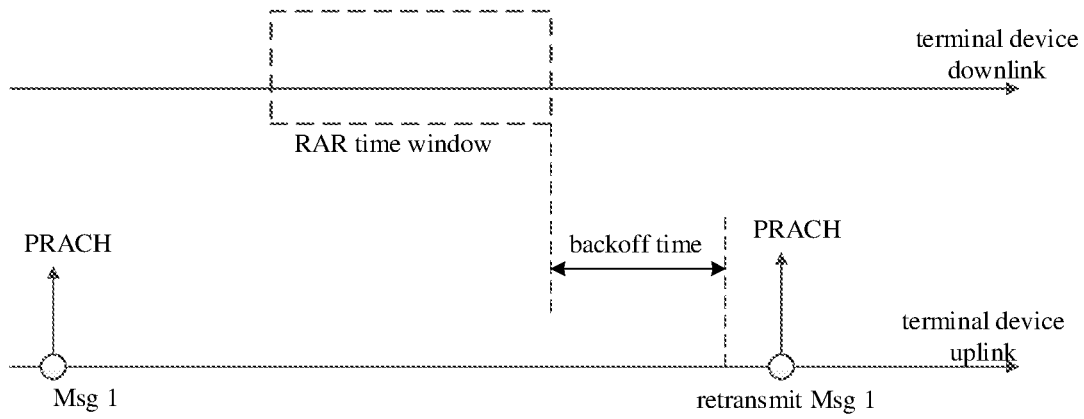

FIG. 11

Determine, by a network device, a starting time moment of a contention resolution timer according to a time of a repeatedly transmitted Msg3   S401

FIG. 12

Determine, by a network device, a starting time moment of a RAR time window according to a random access occasion corresponding to a repeatedly transmitted Msg1   S1001

FIG. 13 terminal device 500 third receiving unit 505 first processing unit 501 — second receiving unit 503 first receiving unit 502    first sending unit 504

FIG. 14 terminal device 600 sixth receiving unit 604 — second sending unit 605 second processing unit 601 — fifth receiving unit 603 fourth receiving unit 602

FIG. 15 network device 800 fifth sending unit 804 third processing unit 801 — fourth sending unit 803 third sending unit 802

RANDOM ACCESS METHOD, AND ELECTRONIC DEVICE AND STORAGE MEDIUM

CROSS-REFERENCE TO RELATED APPLICATION

This application is a continuation of International Application No. PCT/CN2020/141746, filed on Dec. 30, 2020, which is incorporated herein by reference in its entirety.

TECHNICAL FIELD

Embodiments of the present disclosure relate to the wireless communication technical field, and more specifically, to a random access method, an electronic device, and a storage medium.

BACKGROUND

In a random access procedure, in order to improve the coverage performance of a terminal device, a method of Msg1 transmission repetition and/or Msg3 transmission repetition may be used. When performing Msg1 and/or Msg3 transmission repetitions, how to improve the success rate of random access is always the goal that is pursued.

SUMMARY

Embodiments of the present disclosure provide a random access method, and electronic device, and a storage medium, which can improve the success rate of random access.

In a first aspect, an embodiment of the present disclosure provides a random access method, including: determining, by a terminal device, a starting time moment of a contention resolution timer according to a time of Msg3 transmission repetitions.

In a second aspect, an embodiment of the present disclosure provides a random access method, including: determining, by a terminal device, a starting time moment of a random access response window according to a random access occasion corresponding to Msg1 transmission repetitions.

In a third aspect, an embodiment of the present disclosure provides a random access method, including: determining, by a network device, a starting time moment of a contention resolution timer according to a time of Msg3 transmission repetitions.

In a fourth aspect, an embodiment of the present disclosure provides a random access method, including: determining, by a network device, a starting time moment of a random access response window according to a random access occasion corresponding to Msg1 transmission repetitions.

In a fifth aspect, an embodiment of the present disclosure provides a terminal device, including: a first processing unit configured to determine a starting time moment of a contention resolution timer according to a time of Msg3 transmission repetitions.

In a sixth aspect, an embodiment of the present disclosure provides a terminal device, including: a second processing unit configured to determine a starting time moment of a random access response window according to a random access occasion corresponding to Msg1 transmission repetitions.

In a seventh aspect, an embodiment of the present disclosure provides a network device, including: a third processing unit configured to determine a starting time moment of a contention resolution timer according to a time of Msg3 transmission repetitions.

In an eighth aspect, an embodiment of the present disclosure provides a network device, including: a fourth processing unit configured to determine a starting time moment of a random access response window according to a random access occasion corresponding to Msg1 transmission repetitions.

In a ninth aspect, an embodiment of the present disclosure provides a terminal device, including a processor and a memory for storing a computer program that can be run on the processor, wherein the processor is configured to, when the computer programs are run, perform steps of a random access method performed by the terminal device.

In a tenth aspect, an embodiment of the present disclosure provides a network device, including a processor and a memory for storing a computer program that can be run on the processor, wherein the processor is configured to, when the computer programs are run, perform steps of a random access method performed by the network device.

In an eleventh aspect, an embodiment of the present disclosure provides a chip, including: a processor configured to call and run a computer program from a memory, so that a device in which the chip is installed performs the random access method performed by the above-mentioned terminal device.

In a twelfth aspect, an embodiment of the present disclosure provides a chip, including: a processor configured to call and run a computer program from a memory, so that a device in which the chip is installed performs the random access method performed by the above-mentioned network device.

In a thirteenth aspect, an embodiment of the present disclosure provides a storage medium that stores an executable program, and when the executable program is executed by a processor, the random access method performed by the above-mentioned terminal device is implemented.

In a fourteenth aspect, an embodiment of the present disclosure provides a storage medium that stores an executable program, and when the executable program is executed by a processor, the random access method performed by the above-mentioned network device is implemented.

In a fifteenth aspect, an embodiment of the present disclosure provides a computer program product, including computer program instructions, wherein the computer program instructions cause a computer to perform the random access method performed by the above-mentioned terminal device.

In a sixteenth aspect, an embodiment of the present disclosure provides a computer program product, including computer program instructions, wherein the computer program instructions cause a computer to perform the random access method performed by the above-mentioned network device.

In a seventeenth aspect, an embodiment of the present disclosure provides a computer program, wherein the computer program causes a computer to perform the random access method performed by the above-mentioned terminal device.

In an eighteenth aspect, an embodiment of the present disclosure provides a computer program, wherein the computer program causes a computer to perform the random access method performed by the above-mentioned network device.

In the random access method, electronic device, and storage medium provided by embodiments of the present disclosure, the terminal device or network device determines a starting time moment of a contention resolution timer according to a time of Msg3 transmission repetitions; the terminal device or network device determines a starting time moment of a random access response window according to a random access occasion corresponding to Msg1 transmission repetitions. Thus, the embodiments of the present disclosure can avoid the problem of Msg2 reception failure caused by the inconsistency of the understanding of the RAR window by the terminal device and the network device, and avoid the problem of Msg4 reception failure caused by inconsistency of the understanding of a contention resolution window by the terminal device and the network device, thereby improving the success rate of random access.

BRIEF DESCRIPTION OF THE DRAWINGS

FIG. 10 is a schematic diagram of another optional processing flow of a random access method applied to a terminal device provided in an embodiment of the present disclosure;

FIG. 11 is an optional schematic diagram of a terminal device performing Msg1 transmission repetition(s) in related art;

FIG. 12 is a schematic diagram of an optional processing flow of a random access method applied to a network device provided in an embodiment of the present disclosure;

FIG. 13 is a schematic diagram of another optional processing flow of a random access method applied to a network device provided by an embodiment of the present disclosure;

FIG. 14 is a schematic diagram of an optional composition structure of a terminal device provided by an embodiment of the present disclosure;

FIG. 15 is a schematic diagram of another optional composition structure of a terminal device provided by an embodiment of the present disclosure;

FIG. 16 is a schematic diagram of an optional composition structure of a network device provided by an embodiment of the present disclosure;

DETAILED DESCRIPTION

Figure 1:
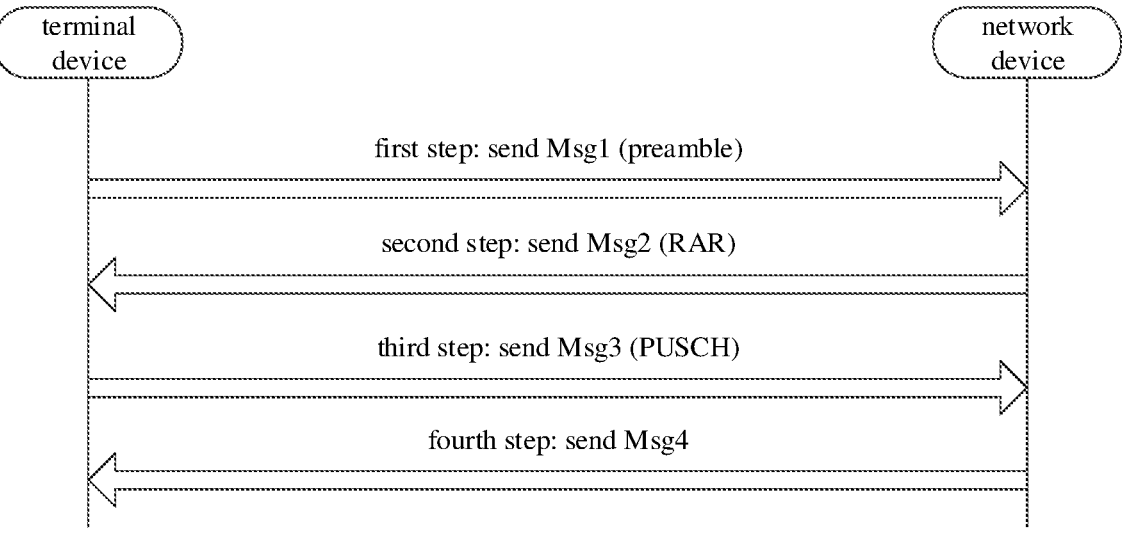
FIG. 1 is a schematic diagram of a processing flow of a four-step random access procedure according to an embodiment of the present disclosure.

In order to understand the characteristics and technical contents of the embodiments of the present disclosure in more detail, the implementations of the embodiments of the present disclosure will be described in detail below in conjunction with the accompanying drawings. The accompanying drawings are only for reference and description, and are not intended to limit the embodiments of the present disclosure.

Before describing the embodiments of the present disclosure, a brief description of relevant contents will be given.

The New Radio (NR) system is mainly designed to support an Enhanced Mobile Broadband (eMBB) service, in order to meet requirements of high speed, high spectrum efficiency and large bandwidth. However, in practical applications, there are many different types of services besides eMBB service, such as sensor networks, video surveillance, and wearable services. These services have demands different from eMBB service in terms of speed, bandwidth, power consumption, and cost. These services have a lower capability requirement for terminal devices than the eMBB service. These services may allow terminal devices to support reduced bandwidth, loosening of processing time, reduction of number of antennas, loosening of maximum modulation order, etc. This type of terminal device may be referred to as a Reduced Capability (RedCap) terminal device for short. It is necessary to optimize the NR system for these services and corresponding reduced capability terminal devices. In LTE technologies, a similar system has been designed to support terminals with a large number of connections, low power consumption, and low cost, such as Machine Type Communication (MTC), Narrow Band Internet of Things (NB-IoT). In the NR system, it is desired to introduce a similar technology to use the NR technology to better support other service types except the eMBB service. For such low-complexity, low-cost terminal device, one dimension of optimization that needs to be carried out is the coverage enhancement of the NR system, which is used to improve the downlink coverage and uplink coverage of the low-complexity, low-cost terminal device.

The following describes the uplink transmission in the NR system. In the NR system, a network device sends an uplink grant (UL grant) through Downlink Control Information (DCI), which is used to schedule a terminal device to transmit a Physical Uplink Shared CHannel (PUSCH); where the DCI may be DCI format 0_0 or DCI format 0_1.

When the network device schedules uplink data transmission through DCI, the DCI carries a Time Domain Resource Allocation (TDRA) field. The TDRA field is 4 bits and can indicate 16 different rows in a resource allocation table, each row contains a different resource allocation combination, such as the starting position S of PUSCH, the length L of PUSCH, k2, and different PUSCH time domain resource allocation type(s), etc. The k2 represents the number of offset slots between the slot where the DCI is located and the slot where the PUSCH scheduled by the DCI is located. The mapping type of PUSCH includes Type A and Type B; the difference between Type A and Type B is that the range of S candidate values and range of L candidate values corresponding to the two types are different. Type A is mainly for a slot-based service, S is earlier and L is longer. Type B is mainly for a URLLC service and has higher requirement on delay, and thus the position of S is more flexible to transmit URLLC service arriving at any time, and L is shorter to reduce transmission delay. The valid combinations of optional value ranges of S and L are shown in Table 1 below.

TABLE 1

| PUSCH mapping type) | Normal cyclic prefix | | | Extended cyclic prefix | | |
|---|---|---|---|---|---|---|
| | S | L | S + L | S | L | S + L |
| Type A | 0 | $\{4, \ldots, 14\}$ | $\{4, \ldots, 14\}$ (repetition Type A only) | 0 | $\{4, \ldots, 12\}$ | $\{4, \ldots, 12\}$ |
| Type B | $\{0, \ldots, 13\}$ | $\{1, \ldots, 14\}$ | $\{1, \ldots, 14\}$ for repetition Type A, $\{1, \ldots, 27\}$ for repetition Type B | $\{0, \ldots, 11\}$ | $\{1, \ldots, 12\}$ | $\{1, \ldots, 12\}$ |

The time domain resource allocation parameters of PUSCH are shown in Table 2 below, which is the default PUSCH time domain resource configuration A for the normal cyclic prefix. Specifically, a kind of time domain resource information in Table 2 can be indicated through DCI.

TABLE 2

| Row index | PUSCH mapping type) | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

The four-step random access procedure of the NR system, as shown in FIG. 1, includes:

In the first step, a terminal device sends a PRACH to a network device. The PRACH includes a random access preamble. That is, the terminal device sends a message 1 (Msg1) to the network device, and Msg1 carries the preamble.

In the second step, after the network device detects that a terminal device sends a preamble, the network device sends a Random Access Response (RAR) to the terminal device. That is, the network device sends Msg2 to the terminal device to inform the terminal device of the PUSCH resource that can be used when sending Msg3, a Radio Network Temporary Identity (RNTI) assigned to the terminal device, and a time advance command provided for the terminal device, etc.

In the third step, after receiving the RAR message, the terminal device sends a Msg3 message on the PUSCH resource specified by the RAR message, and the Msg3 message carries specific temporary identification information of the terminal device.

In the fourth step, the network device sends a Msg4 message to the terminal device, which includes a contention resolution message, and allocates an uplink transmission resource for the terminal device. When the terminal device receives the Msg4 sent by the network device, it will detect whether the terminal device-specific temporary identifier sent by the terminal device in Msg3 is included in the contention resolution message sent by the network device; if it is included, it indicates that the random access procedure of the terminal device is successful; otherwise, the random access procedure is considered to have failed, and the terminal device needs to initiate the random access procedure from the first step again.

In order to improve the uplink coverage of the terminal device, one solution is to improve the uplink coverage of the terminal device by Hybrid Automatic Repeat reQuest (HARQ) retransmission of Msg3. Specifically, the network device sends to the terminal device RAR carrying uplink scheduling information to schedule the initial transmission of Msg3 by the terminal device. If the network device does not successfully receive Msg3, the network device schedules Msg3 for HARQ retransmission through DCI. That is, each Msg3 transmission repetition needs to be implemented through a DCI scheduling. The network device sends a DCI to the terminal device, the terminal device is scheduled to retransmit Msg3 once. During the implementation of random access, the applicant found that each Msg3 transmission repetition being implemented through a DCI scheduling greatly consumes system resources. Therefore, the applicant proposes the method of Msg3 transmission repetition and/or Msg1 transmission repetition to improve the uplink coverage of the terminal device. Specifically, the network device sends retransmission indication information once to indicate X Msg3 transmission repetitions, and the X Msg3 transmission repetitions may be called a transmission repetition set. The present disclosure clarifies how to determine a Random Access Response (RAR) window and a contention resolution window (the time moment for restarting the contention resolution timer) when there are multiple transmission repetitions in a transmission repetition set, and how to determine the RAR window and the contention resolution window (the time moment for restarting the contention resolution timer) when there are multiple transmission repetition sets. The present disclosure can avoid the problem of Msg2 reception failure caused by the inconsistent understanding of the RAR window by the terminal device and the network device, and avoid the problem of Msg4 reception failure caused by inconsistent understanding of the contention resolution window between the terminal device and the network device.

The RAR window will be described below. The network device indicates, through system information, configuration information (ra-SearchSpace) of a search space of a PDCCH required for the terminal device to receive the RAR. The terminal device detects the PDCCH corresponding to Msg1 in the search space within the RAR window, thereby receiving RAR information corresponding to Msg1. Specifically, within the RAR window, the network device sends PDCCH carrying DCI format 1-0 scrambled by RA-RNTI to the terminal device. The search space configured through ra-SearchSpace is Type1-PDCCH common search space. The RAR window is configured through the higher layer parameter ra-ResponseWindow. The RAR window starts from the first symbol of the nearest Control Resource Set (CORESET) after at least one symbol after the last symbol of the random access occasion, and the CORESET is a CORESET configured by the ra-SearchSpace configuration information.

The configuration information of the RAR window is as follows:

ra-ResponseWindow ENUMERATED {s11, s12, s14, s18, s110, s120, s140, s180}, where s180 indicates that the length of the RAR window is 80 slots. The biggest length of the RAR window is 10 ms.

Figure 2:
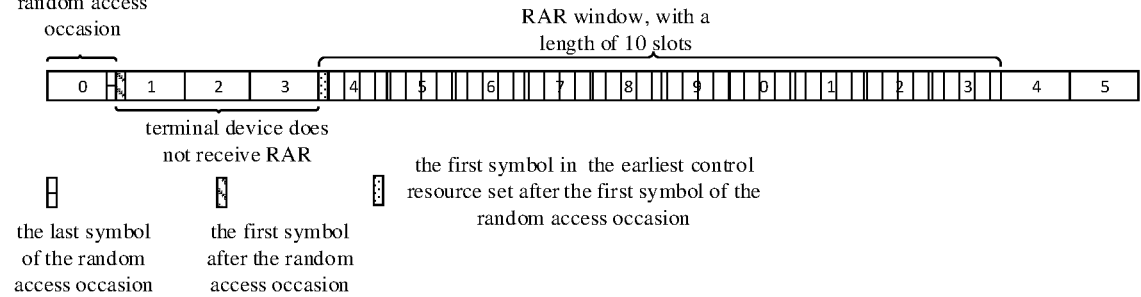
FIG. 2 is an optional schematic diagram of a RAR window of the present disclosure.

An optional schematic diagram of the RAR window is as shown in FIG. 2. The size of the RAR window is 10 slots, and the subcarrier spacing is 15 kHz. The RAR window starts from the first symbol in the earliest CORESET after at least one symbol after the last symbol of the PRACH occasion. The CORESET is the time-frequency resource configured in the Type1-PDCCH common search space for receiving the PDCCH.

The technical solutions of the embodiments of the present disclosure can be applied to various communication systems, for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time division duplex (TDD) system, Advanced Long Term Evolution (LTE-A) system, New Radio (NR) system, an evolution system of the NR system, LTE-based access to unlicensed spectrum (LTE-U) system, NR-based access to unlicensed spectrum (NR-U) system, Universal Mobile Telecommunications System (UMTS), worldwide interoperability for microwave access (WiMAX) communication system, Wireless Local Area Network (WLAN), Wireless Fidelity (WiFi), next-generation communication system or other communication systems, etc.

The system architecture and service scenarios described in the embodiments of the present disclosure are for more clearly illustrating the technical solutions of the embodiments of the present disclosure, and do not constitute limitations on the technical solutions provided by the embodiments of the present disclosure. One of ordinary skill in this art can know that with the evolution of architecture and the emergence of new service scenarios, the technical solutions provided by the embodiments of the present disclosure are also applicable to similar technical problems.

The network device involved in the embodiments of the present disclosure may be an ordinary base station (such as NodeB or eNB or gNB), a new radio controller (NR controller), a centralized unit, a new radio base station, a remote radio unit, a micro base station, a relay, a distributed unit, a transmission reception point (TRP), a transmission point (TP) or any other device. The embodiments of the present disclosure do not limit the specific technology and specific device form adopted by the network device. For convenience of description, in all the embodiments of the present disclosure, the above-mentioned apparatuses for providing wireless communication functions for a terminal device are collectively referred to as network device.

In embodiments of the present disclosure, the terminal device may be any terminal. For example, the terminal device may be a user device for machine type communication. That is to say, the terminal device may also be called user equipment (UE), mobile station (MS), mobile terminal, terminal, etc. The terminal device may communicate with one or more core networks via a Radio Access Network (RAN). For example, a terminal device may be a mobile phone (or called a "cellular" phone), a computer with a mobile terminal, etc. For example, a terminal device may also be a portable, pocket-sized, handheld, computer built-in, or vehicle-mounted mobile device that exchanges language and/or data with the radio access network. There is no specific limitation in the embodiments of the present disclosure.

Optionally, the network device and terminal device may be deployed on land, including indoor or outdoor, handheld or vehicle-mounted; they may also be deployed on water; they may also be deployed on aircraft, balloons or artificial satellites in the air. The embodiments of the present disclosure do not limit the application scenarios of the network device and the terminal device.

Optionally, communications between the network device and the terminal device and between terminal devices may be performed through licensed spectrum, or through unlicensed spectrum, or through both licensed spectrum and unlicensed spectrum. Communications between the network device and the terminal device and between terminal devices may be performed through frequency spectrums below 7 gigahertz (GHz), communications may also be performed through frequency spectrums above 7 GHz, or communications may be performed through frequency spectrums below 7 GHz and frequency spectrums above 7 GHz at the same time. The embodiments of the present disclosure do not limit the frequency spectrum resources used between the network device and the terminal device.

Generally speaking, the number of connections supported by traditional communication systems is limited and easy to implement. However, with the development of communication technologies, mobile communication systems will not only support traditional communication, but also support, for example, Device to Device (D2D) communication, Machine to Machine (M2M) communication, Machine Type Communication (MTC), and Vehicle to Vehicle (V2V) communication, etc., and the embodiments of the present disclosure may also be applied to these communication systems.

Figures 3, 4:
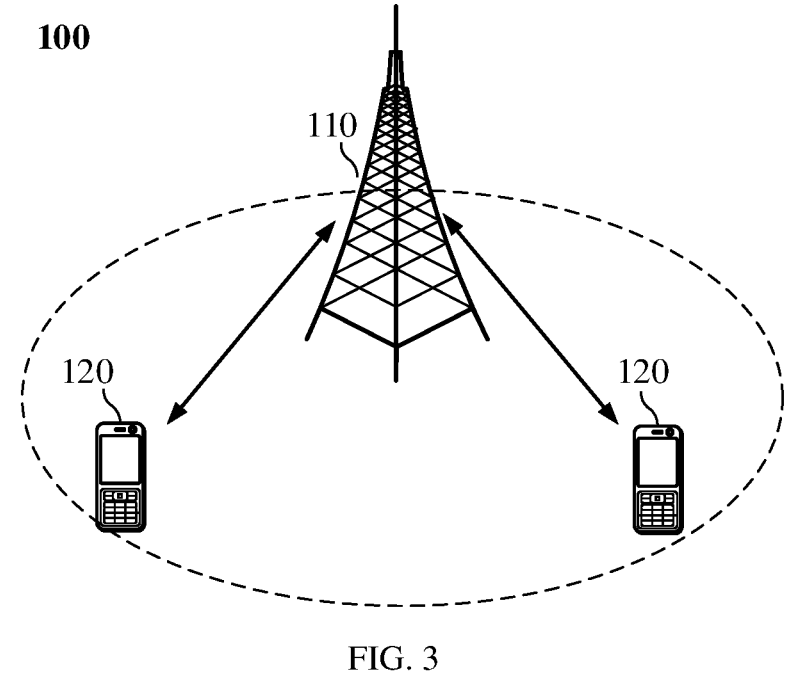
FIG. 3 is a schematic diagram of the composition and structure of a communication system according to an embodiment of the present disclosure.
FIG. 4 is an optional processing flow of a random access method applied to a terminal device provided by an embodiment of the present disclosure.

Exemplarily, a communication system 100 which embodiments of the present disclosure may be applied is shown in FIG. 3. The communication system 100 may include a network device 110, and the network device 110 may be a device for communicating with a terminal device 120 (or called a communication terminal, terminal). The network device 110 may provide communication coverage for a specific geographical area, and may communicate with terminal devices in the coverage area. Optionally, the network device 110 may be a base station (Base Transceiver Station, BTS) in a GSM system or a CDMA system, or a base station (NodeB, NB) in a WCDMA system, or an evolved type base station (Evolutional Node B, eNB or eNodeB) in LTE system, or a wireless controller in a Cloud Radio Access Network (CRAN), or the network device may be a mobile switching center, a relay station, an access point, a vehicle-mounted device, a wearable device, a hub, a switch, a bridge, a router, a network-side device in the 5G network or a network device in the future evolution of the Public Land Mobile Network (PLMN), etc.

The communication system 100 further includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

Optionally, a Device to Device (D2D) communication may be performed between the terminal devices 120.

Optionally, the 5G system or 5G network may also be referred to as a New Radio (NR) system or NR network.

FIG. 3 exemplarily shows one network device and two terminal devices. Optionally, the communication system 100 may include multiple network devices and the coverage of each network device may include other numbers of terminal devices, and embodiments of the present disclosure do not impose specific limitations on this.

Optionally, the communication system 100 may further include other network entities such as a network controller or a mobility management entity, and embodiments of the present disclosure do not impose specific limitations on this.

It should be understood that a device with a communication function in the network/system in embodiments of the present disclosure may be referred to as a communication device. Taking the communication system 100 shown in FIG. 3 as an example, the communication device may include the network device 110 and the terminal devices 120 having a communication function. The network device 110 and the terminal devices 120 may be the specific devices described above, and repeated descriptions will be omitted here. The communication device may also include other devices in the communication system 100, such as a network controller, a mobility management entity, or other network entities, and embodiments of the present disclosure do not impose specific limitations on this.

An optional processing flow of a random access method applied to a terminal device provided in an embodiment of the present disclosure, as shown in FIG. 4, includes the following steps:

In step S201, a terminal device determines a starting time moment of a contention resolution timer according to a time of Msg3 transmission repetitions.

In some embodiments, the coverage performance of the RedCap terminal device is improved by Msg3 transmission repetitions.

In some embodiments, the terminal device receives first indication information sent by the network device, where the first indication information is used to indicate the number of Msg3 transmission repetitions. If the first indication information indicates that the number of Msg3 transmission repetitions is N, then N Msg3 transmission repetitions may be called a first transmission repetition set or a first transmission repetition bundle. The N Msg3 transmission repetitions are indicated by one piece of information (first indication information), and such method can save network resources as compared with related art in which each Msg3 transmission repetition is scheduled by one DCI.

In specific implementations, the first indication information may be carried in at least one of the following information: first higher layer signaling, uplink grant carried by RAR, and first DCI.

In embodiments of the present disclosure, the terminal device may determine the time moment of Msg3 transmission repetitions according to the number of Msg3 transmission repetitions indicated by the first indication information and a time domain resource indicated by RAR. For example, if the first indication information indicates that the number of Msg3 transmission repetitions is 3, the terminal device performs Msg3 transmission repetitions in three consecutive uplink slots.

In some optional embodiments, the terminal device determines the starting time moment of a contention resolution timer (ra-Contention Resolution) according to the time of each Msg3 transmission repetition. In specific implementations, the terminal device starts the ra-Contention Resolution timer at the first symbol after each Msg3 transmission repetition; the duration of the ra-Contention Resolution timer restarted each time may be the same as the duration of the ra-Contention Resolution timer started the first time.

Figure 5:
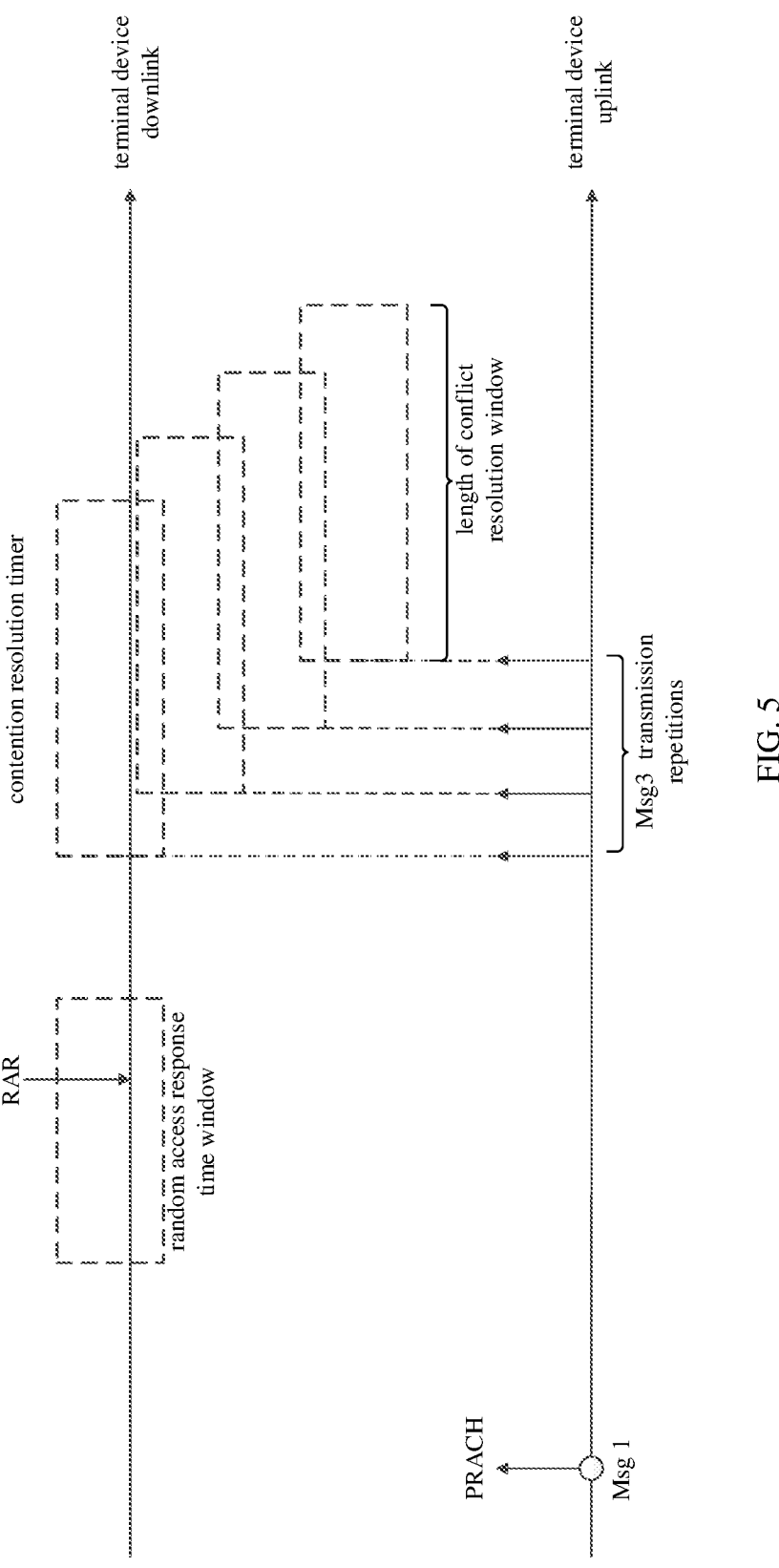
FIG. 5 is a schematic diagram of determining a starting time moment of a contention resolution timer according to the time of each Msg3 transmission repetition by a terminal device according to an embodiment of the present disclosure.

For example, as shown in FIG. 5, the terminal device determines the starting time moment of the contention resolution timer according to the time of each Msg3 transmission repetition. When the terminal device repeatedly transmits Msg3 each time, even if the ra-Contention Resolution timer started for the immediate prior Msg3 transmission repetition has not ended, a ra-Contention Resolution timer is still restarted at the first symbol after the present Msg3 transmission repetition; and the ra-Contention Resolution timer started for the immediate prior Msg3 transmission repetition does not continue timing.

In some other optional embodiments, the terminal device determines the starting time moment of the contention resolution timer according to the time of the last Msg3 transmission repetition of all first transmission repetition sets. In specific implementations, the network device may send first indication information to the terminal device. The first indication information is used to indicate that the N Msg3 transmission repetitions performed by the terminal device are called a first transmission repetition set. If the network device does not successfully receive the Msg3 after the transmission of the first transmission repetition set is completed, and the ra-Contention Resolution timer has not expired, the network device may send second indication information to the terminal device. The second indication information may be carried in a second DCI. The second DCI is used to schedule the terminal device to perform Msg3 transmission repetitions again. The number of Msg3 transmission repetitions again may be determined by one of the following information: the number of Msg3 transmission repetitions which is indicated by the network device last time, second higher layer signaling and the second DCI. That is, the number of Msg3 transmission repetitions performed by the terminal device again may be the same as the number of immediate prior Msg3 transmission repetitions performed by the terminal device. Or, the difference between the number of Msg3 transmission repetitions performed by the terminal device again and the number of immediate prior Msg3 transmission repetitions performed by the terminal device may be a preset value. Or, the terminal device receives the second higher layer signaling or the second DCI sent by the network device, and determines the number of Msg3 transmission repetitions performed by the terminal device again according to the second higher layer signaling or the second DCI. Therefore, according to the indication of the network device, the terminal device may transmit one first transmission repetition set, or may transmit two or more first transmission repetition sets. Each first transmission repetition set may include multiple Msg3 transmission repetitions. The terminal device starts the ra-Contention Resolution timer at the first symbol after the last Msg3 transmission repetition.

Figure 6:
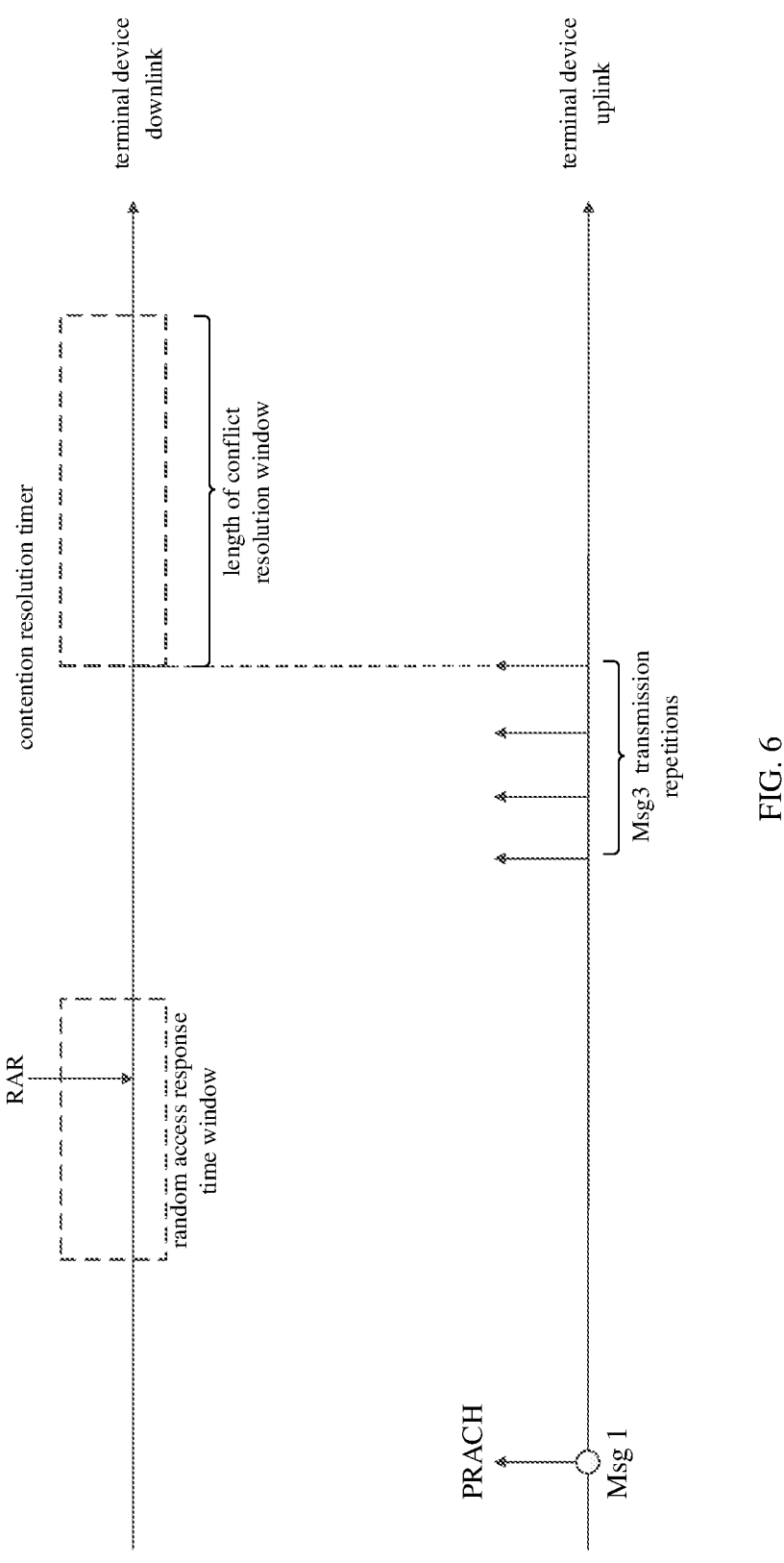
FIG. 6 is a schematic diagram of determining a starting time moment of a contention resolution timer according to the time of each Msg3 transmission repetition according to an embodiment of the present disclosure.

For example, taking a terminal device being indicated with one first transmission repetition set as an example, the terminal device determines the starting time moment of the contention resolution timer according to the time of each Msg3 transmission repetition. As shown in FIG. 6, the network device indicates, through first indication information, that the number of Msg3 transmission repetitions is 4. The terminal device only restarts the ra-Contention Resolution timer at the first symbol after the fourth Msg3 transmission repetition (that is, the last transmission repetition).

In some optional embodiments, the terminal device determines the starting time moment of the contention resolution timer according to the time of the last Msg3 transmission repetition of each first transmission repetition set. In specific implementations, the network device may send first indication information to the terminal device. The first indication information is used to indicate that N Msg3 transmission repetitions performed by the terminal device are called a first transmission repetition set. If the network device does not successfully receive the Msg3 after the transmission of the first transmission repetition set is completed, and the ra-Contention Resolution timer has not expired, the network device may send second indication information to the terminal device. The second indication information may be carried in a second DCI. The second DCI is used to schedule the terminal device to perform Msg3 transmission repetitions again. The number of Msg3 transmission repetitions performed by the terminal again may be determined by one of the following information: the number of Msg3 transmission repetitions which is indicated by the network device last time, second higher layer signaling and the second DCI. That is, the number of Msg3 transmission repetitions performed by the terminal device again may be the same as the number of immediate prior Msg3 transmission repetitions performed by terminal device. Or, the difference between the number of Msg3 transmission repetitions performed by the terminal device again and the number of immediate prior Msg3 transmission repetitions performed by the terminal device may be a preset value. Or, the terminal device receives the second higher layer signaling or the second DCI sent by the network device, and determines the number of Msg3 transmission repetitions performed by the terminal device again according to the second higher layer signaling or the second DCI. Therefore, according to the indication of the network device, the terminal device may transmit one first transmission repetition set, or may transmit two or more first transmission repetition sets. Each first transmission repetition set may include multiple Msg3 transmission repetitions. The terminal device starts the ra-Contention Resolution timer at the first symbol after the last Msg3 transmission repetition of each first transmission repetition set. The duration of the ra-Contention Resolution timer restarted by the terminal device each time may be the same as the duration of the immediate prior restarted ra-Contention Resolution timer.

Figure 7:
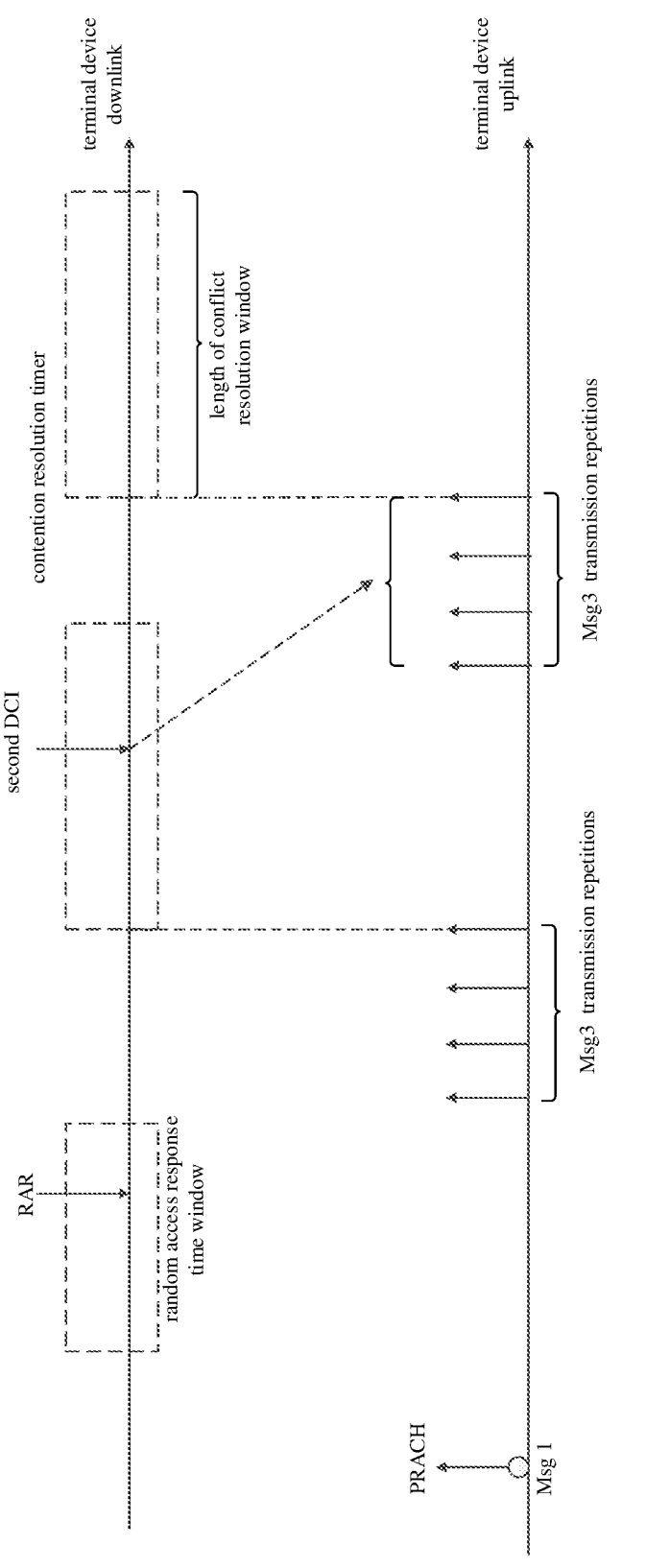
FIG. 7 is a schematic diagram of determining a starting time moment of a contention resolution timer according to the time of the last Msg3 transmission repetition in each transmission repetition set according to an embodiment of the present disclosure.

For example, taking the terminal device being indicated with two first transmission repetition sets as an example, the terminal device determines the starting time moment of the contention resolution timer according to the time of the last Msg3 transmission repetition of each transmission repetition set. As shown in FIG. 7, the network device indicates the first transmission repetition set through the first indication information, and the number of Msg3 transmission repetitions of the first transmission repetition set is 4. The terminal device restarts the ra-Contention Resolution timer at the first symbol after the fourth Msg3 transmission repetition of the first transmission repetition set. Since the network device does not successfully receive the Msg3 after the transmission of the first transmission repetition set is completed, and the ra-Contention Resolution timer has not expired, the network device sends to the terminal device the second DCI for scheduling the terminal device to perform Msg3 transmission repetitions again. The terminal device performs Msg3 transmission repetitions again based on the second indication information. The terminal device determines that the number of Msg3 transmission repetitions again is the same as the number of immediate prior Msg3 transmission repetitions. The terminal restarts the ra-Contention Resolution timer at the first symbol after the fourth Msg3 transmission repetition among the Msg3 transmission repetitions again.

In some embodiments, if the terminal device receives Msg4 and/or the physical downlink control channel (PDCCH) that schedules Msg4 before end of the Msg3 transmission repetition(s), the terminal device stops transmission repetition(s). In specific implementations, after starting or restarting the ra-Contention Resolution timer, the terminal device monitors the PDCCH that schedules the Msg4 transmission within the time range of the contention resolution timer, and receives the Msg4, and completes contention resolution through Msg4. When the terminal device can receive contention resolution information, including the Physical Downlink Shared Channel (PDSCH) carrying the Msg4 and/or Physical Downlink Control CHannel (PDCCH) scheduling the PDSCH in the started contention resolution window before end of one transmission of the first transmission repetition set, the terminal device terminates the Msg3 transmission repetition(s) not performed in this first transmission repetition set.

Figure 8:
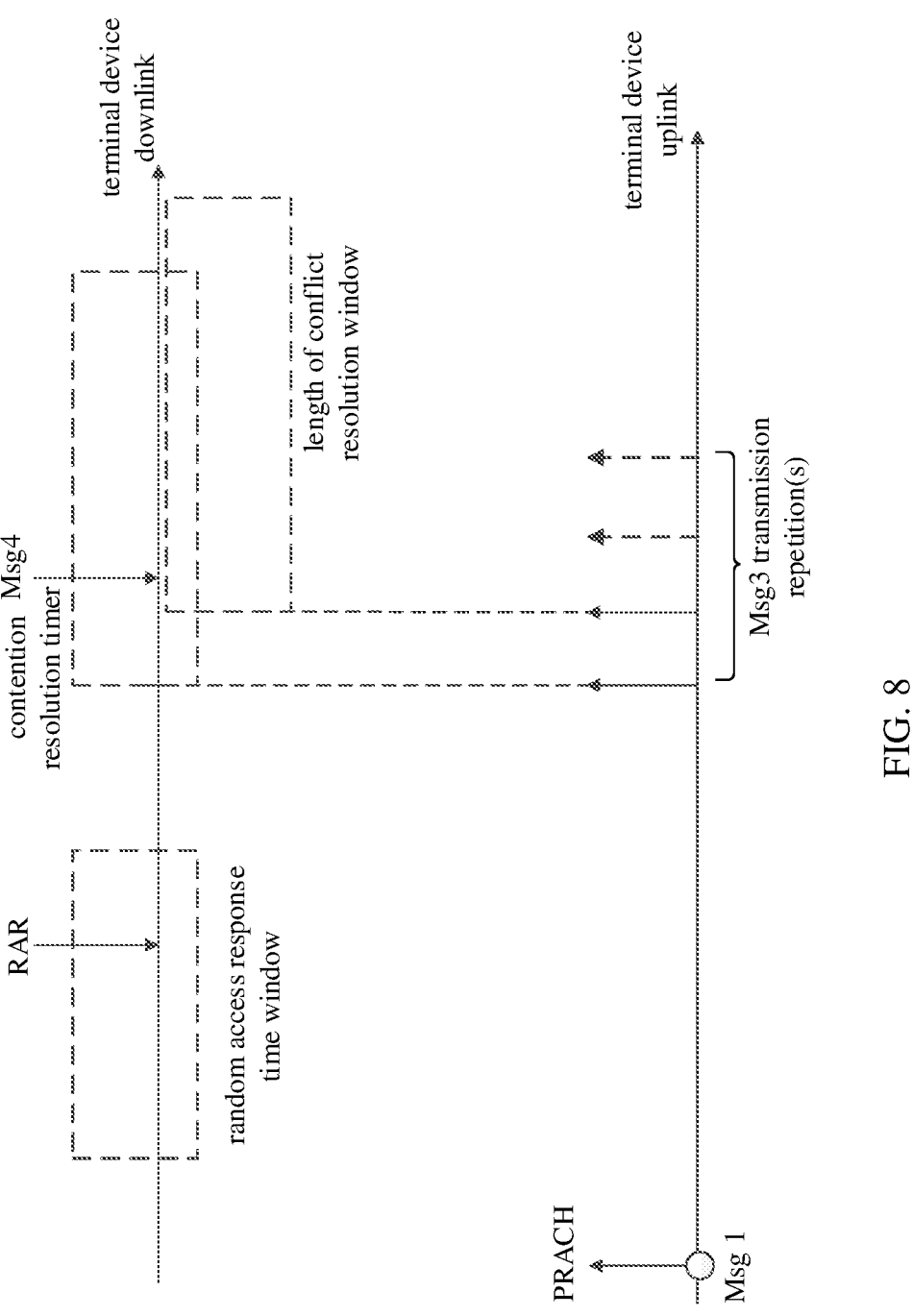
FIG. 8 is an optional schematic diagram of a terminal device terminating transmission repetition(s) according to an embodiment of the present disclosure.

An optional schematic diagram of a terminal device terminating transmission repetition(s) is as shown in FIG. 8. The terminal device starts the contention resolution timer after the second Msg3 transmission repetition in the first transmission repetition set, and receives the PDSCH carrying the Msg4 and/or the PDCCH scheduling the PDSCH before the third Msg3 transmission repetition, the terminal device terminates the third Msg3 transmission repetition and the fourth Msg3 transmission repetition which are not performed in the first transmission repetition set.

Figure 9:
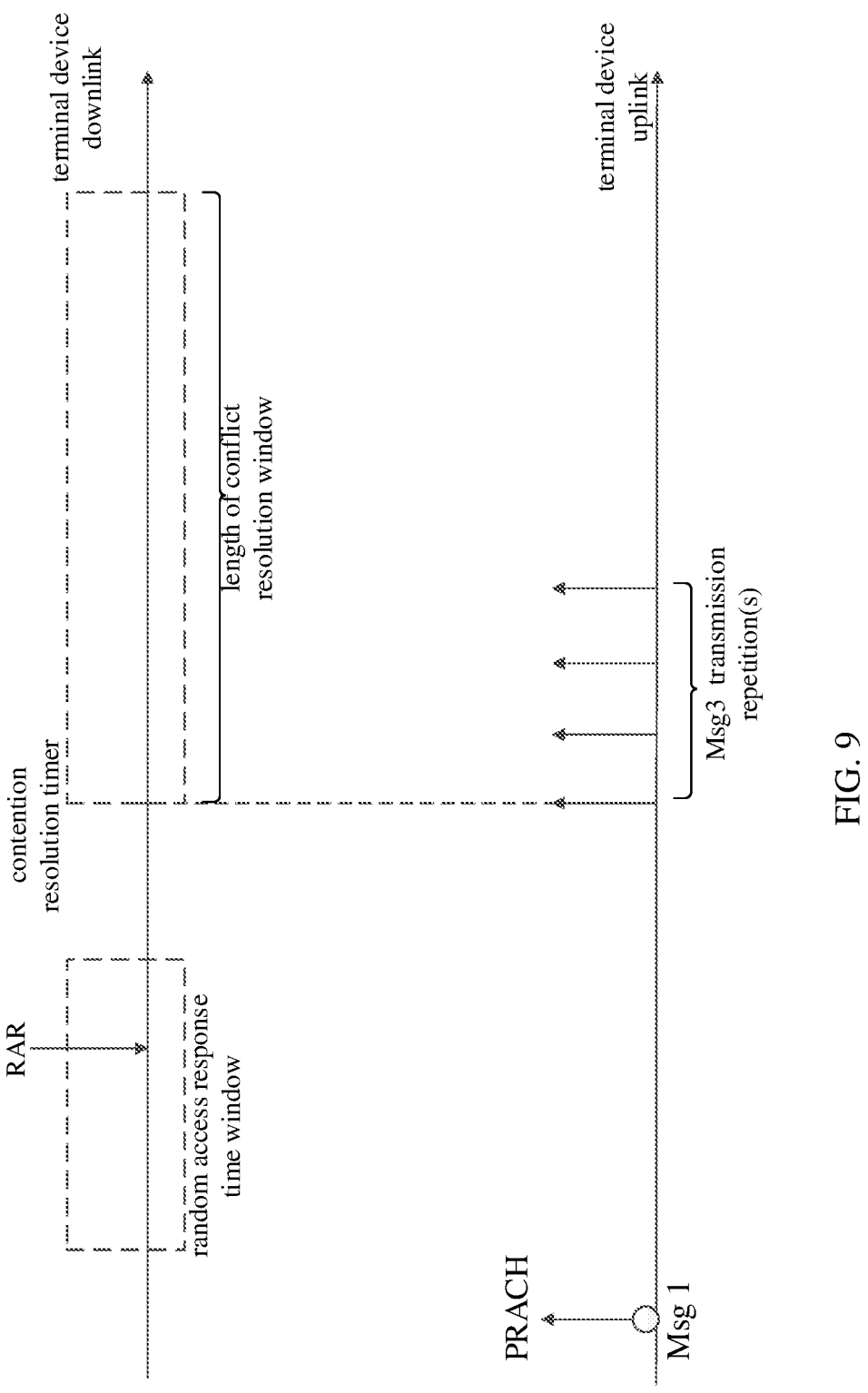
FIG. 9 is a schematic diagram of Msg3 transmission repetition(s) in related art.

In related art, a schematic diagram of Msg3 transmission repetitions is shown in FIG. 9. The ra-Contention Resolution timer is started or restarted at the first Msg3 transmission repetition. If the number of Msg3 transmission repetitions is four, the network device needs to wait for four Msg3 transmission repetitions and perform joint reception, and then the network device performs the transmission of Msg4, and the length of the contention resolution window needs to be extended so that the contention resolution window at least includes the time for four Msg3 transmission repetitions. Therefore, the network device needs to reconfigure the duration of the ra-Contention Resolution timer for the terminal device, and this may make relatively large changes on the basis of the existing random access method. However, in the embodiments of the present disclosure, since the duration of the ra-Contention Resolution timer started or restarted each time is the same as the duration of the ra-Contention Resolution timer started or restarted last time, that is, the length of existing contention resolution window is followed, there is no need to extend the length of the contention resolution window, there is no need to reconfigure the duration of the ra-Contention Resolution timer, and no configuration change is required on the basis of the existing random access method.

The above-mentioned embodiments shown in FIG. 3 are for Msg3 transmission repetition(s). During the random access procedure, transmission repetition(s) of Msg1 may also be performed, or transmission repetition(s) of both Msg1 and Msg3 may be performed. The following describes the method for determining the RAR window in Msg1 transmission repetition(s).

Another optional processing flow of the random access method applied to the terminal device provided in an embodiment of the present disclosure, as shown in FIG. 10, includes the following steps:

In step S301, the terminal device determines a starting time moment of a RAR window according to a random access occasion corresponding to Msg1 transmission repetitions.

In some embodiments, the coverage performance of the RedCap terminal device is improved by Msg1 transmission repetitions. An optional schematic diagram of a terminal device performing Msg1 transmission repetition in related art is as shown in FIG. 11. The network device indicates a PREAMBLE_BACKOFF. If the random access is not completed, the terminal device may follow a uniform distribution function or a value arbitrarily selected between 0 and PREAMBLE_BACKOFF as the backoff time. The backoff time is used to determine the waiting time for the terminal device to initiate a target random access again when the random access is not completed. The PREAMBLE_BACK-OFF may be indicated by a header of a sub-protocol data unit (subPDU) in the RAR message sent by the network device; the PREAMBLE_BACKOFF is a backoff parameter (Backoff Indicator, BI). The terminal device starts a random access resource selection procedure after the backoff time.

The situation where the random access is not completed may be as follows. If during the random access procedure, after the terminal device sends Msg1, the terminal device does not receive a RAR message that matches the preamble in the Msg1 sent by the terminal device after the RAR window expires and the number of times the terminal device sends the preamble does not reach the maximum number of transmissions, it is determined that the random access procedure is not completed. Or, the situation where the random access is not completed may also be as follows. In a four-step random access procedure, the terminal device sends the Msg1 to the network device, and receives the Msg2 sent by the network device. The terminal device starts ra-ContentionResolutionTimer after sending the Msg3. If the contention resolution is not successfully completed when the ra-ContentionResolutionTimer expires, it is determined that the random access procedure is not completed.

The Msg1 transmission repetition(s) by the terminal device shown in FIG. 11 occurs in a scenario where the terminal device has not received the RAR message sent by the network device at the end of the RAR window. In the random access method provided by the embodiments of the present disclosure, the terminal device does not need to wait for the end of the RAR window and then perform the Msg1 transmission repetition(s). The following describes the starting time moment of the RAR window when performing the Msg1 transmission repetitions in the embodiments of the present disclosure.

In some embodiments, the terminal device receives third indication information sent by the network device. The third indication information is used to indicate the number of Msg1 transmission repetitions. If the third indication information indicates that the number of Msg1 transmission repetitions is M, the M Msg1 transmission repetitions may be referred to as a second transmission repetition set or a second transmission repetition bundle. The M MSg1 transmission repetitions are indicated by one piece of information (third indication information), or the terminal device may autonomously determine the number of Msg1 transmission repetitions.

In specific implementations, the third indication information may be carried in at least one of the following information: third higher layer signaling and third DCI.

In some optional embodiments, the terminal device determines the starting time moment of the RAR window according to the random access occasion corresponding to each Msg1 transmission repetition. In specific implementations, the terminal device determines the first symbol in the earliest control resource set after at least one symbol after the last symbol of the random access occasion corresponding to each Msg1 transmission repetition as the starting time moment of the RRA window. The length of each RAR window may be the same as the length of the immediate prior RAR window.

In other optional embodiments, the terminal device determines the starting time moment of the RAR window according to the random access occasion corresponding to the last Msg1 transmission repetition of all second transmission repetition sets. In specific implementations, the terminal device may perform Msg1 transmission repetitions in multiple second transmission repetition sets, and each second transmission repetition set includes M Msg1 transmission repetitions. In this scenario, the terminal device determines the first symbol in the earliest control resource set after at least one symbol after the last symbol of the random access occasion corresponding to the last Msg1 transmission repetition of all second transmission repetition sets as the starting time moment of the RAR window. For example, the terminal device performs Msg1 transmission repetitions in two second transmission repetition sets, the first symbol in the earliest control resource set after at least one symbol after the last symbol of the random access occasion corresponding to the last Msg1 transmission repetition in the latter second transmission repetition set is the starting time moment of the RAR window.

In some other embodiments, the terminal device determines the starting time moment of the RAR window according to the random access occasion corresponding to the last Msg1 transmission repetition in each second transmission repetition set. In specific implementations, the terminal device may perform Msg1 transmission repetitions in multiple second transmission repetition sets, and each second transmission repetition set includes M Msg1 transmission repetitions. In this scenario, the terminal device determines the first symbol in the earliest control resource set after at least one symbol after the last symbol of the random access occasion corresponding to the immediate prior Msg1 transmission repetition in each second transmission repetition set as the starting time moment of the RAR window. For example, the terminal device performs Msg1 transmission repetitions in two second transmission repetition sets, the first symbol in the earliest control resource set after at least one symbol after the last symbol of the random access occasion corresponding to the last Msg1 transmission repetition of the former second transmission repetition set is the starting time moment of the RAR window; and the first symbol in the earliest control resource set after at least one symbol after the last symbol of the random access occasion corresponding to the last Msg1 transmission repetition in the latter second transmission repetition set is also the starting time moment of the RAR window. The length of each RAR window may be the same as the length of the immediate prior RAR window.

In some embodiments, if the terminal device receives PDSCH carrying Msg2 and/or PDCCH scheduling the PDSCH before end of the Msg1 transmission repetitions, the terminal device stops the Msg1 transmission repetition(s). In a specific implementation, after the terminal device determines the starting time moment of the RAR window, and receives PDSCH carrying Msg2 and/or PDCCH scheduling the PDSCH in the RAR window, the terminal device terminates the Msg1 transmission repetition(s) that is(are) not performed.

In the embodiments of the present disclosure, when the random access occasion of each Msg1 transmission repetition is determined, the starting time moment of one or more RAR windows may be determined, and the starting time moment of each RAR window is reset.

In the embodiments of the present disclosure, the durations of all RAR windows are the same, that is, the duration of the existing RAR window is followed, and there is no need to extend the duration of the RAR window, and it is not necessary to reconfigure the duration of the RAR window, and it is not needed to perform configuration change based on the existing random access method.

The random access methods of the embodiments of the present disclosure described with reference to FIG. 3 and the random access methods of the embodiments of the present disclosure described with reference to FIG. 10 may be used simultaneously, or may be used independently, which is not limited here.

An optional processing flow of a random access method applied to a network device provided in an embodiment of the present disclosure, as shown in FIG. 12, includes the following steps:

In step S401, the network device determines a starting time moment of a contention resolution timer according to a time of Msg3 transmission repetitions.

In some embodiments, the specific implementation of the network device determining the starting time moment of the contention resolution timer according to the time of the Msg3 transmission repetitions may be the same as that of determining the starting time moment of the contention resolution timer by the terminal device according to the time of the Msg3 transmission repetitions in the above step S201, and the only difference is that the entity for determining the starting time moment of the contention resolution timer is changed.

In some embodiments, if the network device does not successfully receive the Msg3 transmission repetitions during the running of the contention resolution timer, the network device sends the second indication information to the terminal device. The description of the second indication information in the present disclosure is the same as the description of the second indication information regarding the above step S201, and will not be repeated here.

Another optional processing flow of the random access method applied to network devices provided by an embodiment of the present disclosure, as shown in FIG. 13, includes the following steps:

In step S1001, the network device determines a starting time moment of a random access response window according to a random access occasion corresponding to Msg1 transmission repetitions.

In some embodiments, the specific implementation of the network device determining the starting time moment of the random access response window according to the random access occasion corresponding to the Msg1 transmission repetitions is the same as that of determining the starting time moment of the random access response window by the terminal device according to the random access occasion corresponding to the Msg1 transmission repetitions in above step S201, and the only difference is that the entity for determining the starting time moment of the random access response window is changed.

In some embodiments, the method further includes: the network device sending third indication information to the terminal device, where the third indication information is used to indicate the number of Msg1 transmission repetitions. The first indication information is carried in at least one of the following information: third higher layer signaling and third DCI. The description of the third indication information in the embodiments of the present disclosure is the same as the description of the third indication information in the embodiments regarding step S201, and will not be repeated here.

The random access methods of the embodiments of the present disclosure described with reference to FIG. 12 and the random access methods of the embodiments of the present disclosure described with reference to FIG. 13 may be used simultaneously, or may be used independently, which is not limited here.

It should be noted that starting of the contention resolution timer involved in the embodiments of the present disclosure may also be referred to as restarting of the contention resolution timer.

In the random access methods applied in the network device or the terminal device provided by the embodiments of the present disclosure, it is clarified how to determine the Random Access Response (RAR) window and the contention resolution window (the time moment for restarting the contention resolution timer) when there are multiple transmission repetitions in one transmission repetition set, and how to determine the RAR window and contention resolution window (the time moment for restarting the contention resolution timer) when there are multiple transmission repetition sets. The embodiments of the present disclosure can avoid the problem of Msg2 reception failure caused by inconsistent understanding of the RAR window between the terminal device and the network device, and can avoid the Msg4 reception failure caused by the inconsistent understanding of the contention resolution window between the terminal device and the network device, thereby improving the success rate of random access.

Figures 14, 15, 16:
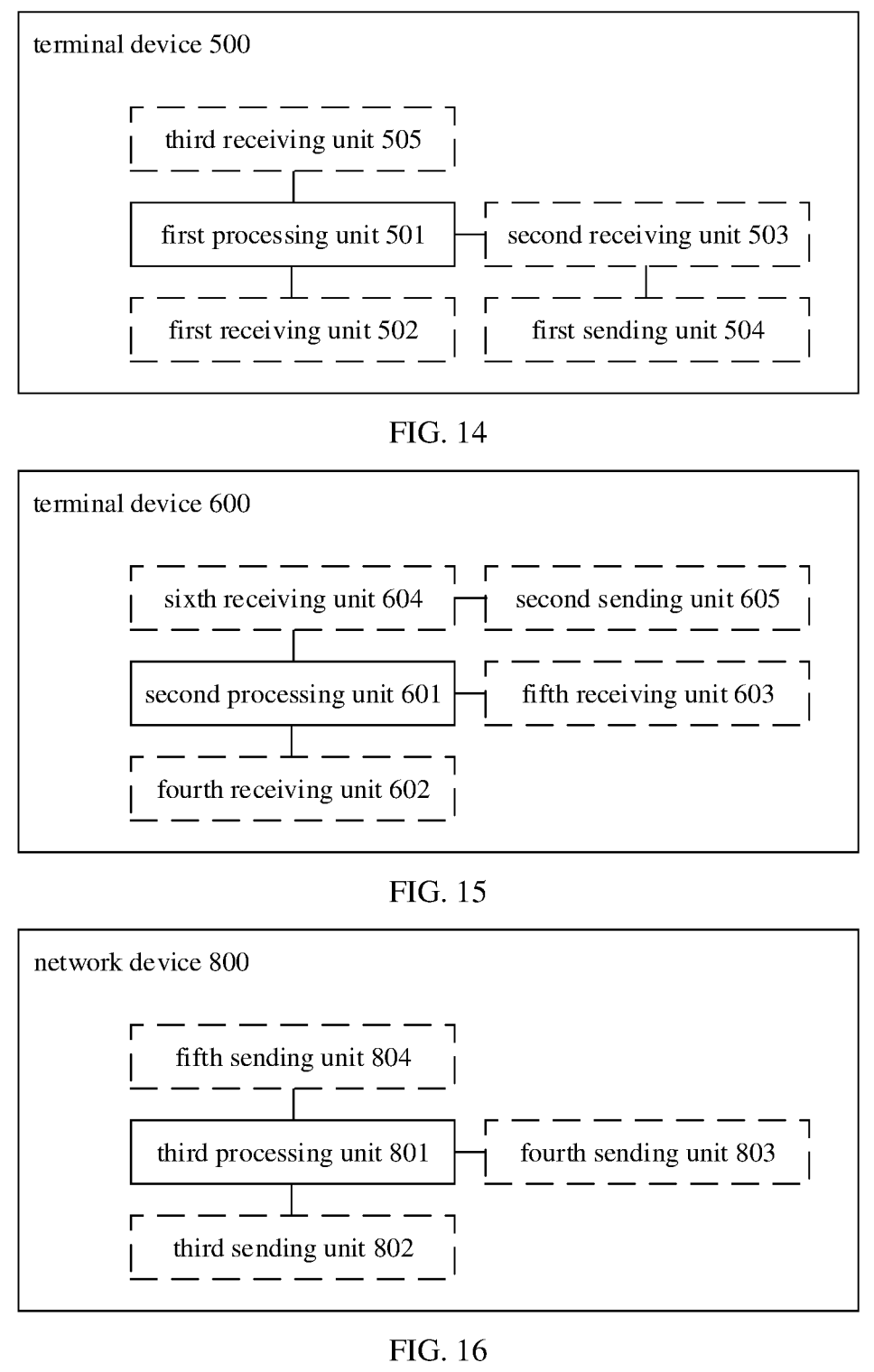

In order to implement the random access methods provided in the embodiments of the present disclosure, an embodiment of the present disclosure also provides a terminal device. An optional composition structure of the terminal device 500, as shown in FIG. 14, includes a first processing unit 501.

The first processing unit 501 is configured to determine a starting time moment of a contention resolution timer according to a time of Msg3 transmission repetitions.

In some optional embodiments, the time of the Msg3 transmission repetitions includes at least one of the following:

a time of each Msg3 transmission repetition; and a time of the last Msg3 transmission repetition.

In some optional embodiments, N transmission repetitions indicated by a network device each time are a first transmission repetition set, and N is a positive integer;

wherein the time of the last Msg3 transmission repetition includes: a time of the last Msg3 transmission repetition of each first transmission repetition set, or a time of the last Msg3 transmission repetition of all first transmission repetition sets.

In some optional embodiments, the starting time moment of the contention resolution timer is located at the first symbol after each Msg3 transmission repetition.

In some optional embodiments, the starting time moment of the contention resolution timer is located at the first symbol after the last Msg3 transmission repetition of all first transmission repetition sets;

wherein the first transmission repetition set includes N transmission repetitions indicated by a network device each time, where N is a positive integer.

In some optional embodiments, the starting time moment of the contention resolution timer is located at the first symbol after the last Msg3 transmission repetition of each first transmission repetition set;

wherein the first transmission repetition set includes N transmission repetitions indicated by a network device each time, where N is a positive integer.

In some optional embodiments, the terminal device 500 further includes:

a first receiving unit 502 configured to receive first indication information sent by a network device, wherein the first indication information is used to indicate the number of Msg3 transmission repetitions.

In some optional embodiments, the first indication information is carried in at least one of the following information:

first higher layer signaling, an uplink grant carried by a Random Access Response (RAR), and first Downlink Control Signaling DCI.

In some optional embodiments, the terminal device 500 further includes:

a second receiving unit 503 configured to, in response to that a network device does not successfully receive the Msg3 transmission repetitions during running of the contention resolution timer, receive second indication information.

In some optional embodiments, the second indication information is carried in a second DCI, and the second DCI is used to schedule the terminal device to perform Msg3 transmission repetitions again.

In some optional embodiments, the terminal device 500 further includes:

a first sending unit 504 configured to perform Msg3 transmission repetitions again based on the second indication information.

In some optional embodiments, the number of Msg3 transmission repetitions again can be determined by one of the following information:

the number of Msg3 transmission repetitions which is last indicated by the network device last time, second higher layer signaling and the second DCI.

In some optional embodiments, the first processing unit 501 is further configured to, in response to that the terminal device receives Msg4 and/or a Physical Downlink Control Channel (PDCCH) scheduling the Msg4 before end of Msg3 transmission repetitions, stop the Msg3 transmission repetitions.

In some optional embodiments, the first processing unit 501 is further configured to:

determine a starting time moment of a random access response window according to a random access occasion corresponding to Msg1 transmission repetitions.

In some optional embodiments, the random access occasion corresponding to Msg1 transmission repetitions includes at least one of the following:

a random access occasion corresponding to each Msg1 transmission repetition; and a random access occasion corresponding to the last Msg1 transmission repetition.

In some optional embodiments, M transmission repetitions are a second transmission repetition set, and M is a positive integer;

wherein the random access occasion corresponding to the last Msg1 transmission repetition includes: a random access occasion corresponding to the last Msg1 transmission repetition of each second transmission repetition set, or a random access occasion corresponding to the last Msg1 transmission repetition of all second transmission repetition sets.

In some optional embodiments, the starting time moment of the random access response window is located at the first symbol in the earliest control resource set after at least one symbol after the last symbol of a random access occasion corresponding to each Msg1 transmission repetition.

In some optional embodiments, the starting time moment of the random access response window is located at the first symbol in the earliest control resource set after at least one symbol after the last symbol of a random access occasion corresponding to the last Msg1 transmission repetition of all second transmission repetition sets;

wherein each second transmission repetition set includes M transmission repetitions, where M is a positive integer.

In some optional embodiments, the starting time moment of the random access response window is located at the first symbol in the earliest control resource set after at least one symbol after the last symbol of a random access occasion corresponding to the last Msg1 transmission repetition of each second transmission repetition set;

wherein each second transmission repetition sets includes M transmission repetitions, where M is a positive integer.

In some optional embodiments, the terminal device 500 further includes:

a third receiving unit 505 configured to receive third indication information sent by a network device, wherein the third indication information is used to indicate the number of Msg1 transmission repetitions.

In some optional embodiments, the third indication information is carried in at least one of the following information: third higher layer signaling and third DCI.

In some optional embodiments, the second processing unit is configured to, in response to that the terminal device receives a Physical Downlink Shared Channel (PDSCH) carrying Msg2 and/or a Physical Downlink Control Channel (PDCCH) scheduling the PDSCH within the random access response window, stop Msg1 transmission repetitions.

In order to implement the random access methods provided by the embodiments of the present disclosure, an embodiment of the present disclosure further provides a terminal device. Another optional composition structure of the terminal device 600, as shown in FIG. 15, includes a second processing unit 601.

The second processing unit 601 is configured to determine a starting time moment of a random access response window according to a random access occasion corresponding to Msg1 transmission repetitions.

In some optional embodiments, the random access occasion corresponding to the Msg1 transmission repetitions includes at least one of the following:

a random access occasion corresponding to each Msg1 transmission repetition; and a random access occasion corresponding to the last Msg1 transmission repetition.

In some optional embodiments, M transmission repetitions are a second transmission repetition set, and M is a positive integer;

wherein the random access occasion corresponding to the last Msg1 transmission repetition includes: a random access occasion corresponding to the last Msg1 transmission repetition of each second transmission repetition set, or a random access occasion corresponding to the last Msg1 transmission repetition of all second transmission repetition sets.

In some optional embodiments, the starting time moment of the random access response window is located at the first symbol in the earliest control resource set after at least one symbol after the last symbol of a random access occasion corresponding to each Msg1 transmission repetition.

In some optional embodiments, the starting time moment of the random access response window is located at the first symbol in the earliest control resource set after at least one symbol after the last symbol of a random access occasion corresponding to the last Msg1 transmission repetition of all second transmission repetition sets;

wherein each second transmission repetition set includes M transmission repetitions, where M is a positive integer.

In some optional embodiments, the starting time moment of the random access response window is located at the first symbol in the earliest control resource set after at least one symbol after the last symbol of a random access occasion corresponding to the last Msg1 transmission repetition of each second transmission repetition set;

wherein each second transmission repetition sets includes M transmission repetitions, where M is a positive integer.

In some optional embodiments, the terminal device 600 further includes:

a fourth receiving unit 602 configured to receive third indication information sent by a network device, wherein the third indication information is used to indicate the number of Msg1 transmission repetitions.

In some optional embodiments, the third indication information is carried in at least one of the following information: third higher layer signaling and third Downlink Control Signaling DCI.

In some optional embodiments, the second processing unit 601 is configured to, in response to that the terminal device receives a Physical Downlink Shared Channel (PDSCH) carrying Msg2 and/or a Physical Downlink Control Channel (PDCCH) scheduling the PDSCH within the random access response window, stop Msg1 transmission repetitions.

In some optional embodiments, the second processing unit 601 is further configured to:

determine a starting time moment of a contention resolution timer according to a time of Msg3 transmission repetitions.

In some optional embodiments, the time of the Msg3 transmission repetitions includes at least one of the following:

a time of each Msg3 transmission repetition; and a time of the last Msg3 transmission repetition.

In some optional embodiments, N transmission repetitions indicated by the network device each time are a first transmission repetition set;

wherein the time of the last Msg3 transmission repetition includes: a time of the last Msg3 transmission repetition of each first transmission repetition set, or a time of the last Msg3 transmission repetition of all first transmission repetition sets.

In some optional embodiments, the starting time moment of the contention resolution timer is located at the first symbol after each Msg3 transmission repetition.

In some optional embodiments, the starting time moment of the contention resolution timer is located at the first symbol after the last Msg3 transmission repetition of all first transmission repetition sets;

wherein the first transmission repetition set includes N transmission repetitions indicated by a network device each time, where N is a positive integer.

In some optional embodiments, the starting time moment of the contention resolution timer is located at the first symbol after the last Msg3 transmission repetition of each first transmission repetition set;

wherein the first transmission repetition set includes N transmission repetitions indicated by a network device each time, where N is a positive integer.

In some optional embodiments, the terminal device 600 further includes:

a fifth receiving unit 603 configured to receive first indication information sent by a network device, wherein the first indication information is used to indicate the number of Msg3 transmission repetitions.

In some optional embodiments, the first indication information is carried in at least one of the following information:

first higher layer signaling, an uplink grant carried by a Random Access Response (RAR), and first DCI.

In some optional embodiments, the terminal device 600 further includes:

a sixth receiving unit 604 configured to, in response to that a network device does not successfully receive the Msg3 transmission repetitions during running of the contention resolution timer, receive second indication information.

In some optional embodiments, the second indication information is carried in a second DCI, and the second DCI is used to schedule the terminal device to perform Msg3 transmission repetitions again.

In some optional embodiments, the terminal device further includes:

a second sending unit 605 configured to perform Msg3 transmission repetitions again based on the second indication information.

In some optional embodiments, the number of Msg3 transmission repetitions again can be determined by one of the following information:

the number of Msg3 transmission repetitions which is indicated by the network device last time, second higher layer signaling and the second DCI.

In some optional embodiments, the second processing unit 601 is further configured to, in response to that the terminal device receives Msg4 and/or a Physical Downlink Control Channel (PDCCH) scheduling the Msg4 before end of Msg3 transmission repetitions, stop Msg3 transmission repetitions.

In order to implement the random access methods provided in the embodiments of the present disclosure, an embodiment of the present disclosure also provides a network device. An optional composition structure of the network device 800, as shown in FIG. 16, includes a third processing unit 801.

The third processing unit 801 configured to determine a starting time moment of a contention resolution timer according to a time of Msg3 transmission repetitions.

In some optional embodiments, the time of the Msg3 transmission repetitions includes at least one of the following:

a time of each Msg3 transmission repetition; and
a time of the last Msg3 transmission repetition.

In some optional embodiments, N transmission repetitions indicated by a network device each time are a first transmission repetition set, and N is a positive integer;

wherein the time of the last Msg3 transmission repetition includes: a time of the last Msg3 transmission repetition of each first transmission repetition set, or a time of the last Msg3 transmission repetition of all first transmission repetition sets.

In some optional embodiments, the starting time moment of the contention resolution timer is located at the first symbol after each Msg3 transmission repetition.

In some optional embodiments, the starting time moment of the contention resolution timer is located at the first symbol after the last Msg3 transmission repetition of all first transmission repetition sets;

wherein the first transmission repetition set includes N transmission repetitions indicated by a network device each time, where N is a positive integer.

In some optional embodiments, the starting time moment of the contention resolution timer is located at the first symbol after the last Msg3 transmission repetition of each first transmission repetition set;

wherein the first transmission repetition set includes N transmission repetitions indicated by a network device each time, where N is a positive integer.

In some optional embodiments, the network device 800 further includes:

a third sending unit 802 configured to send first indication information to a terminal device, wherein the first indication information is used to indicate the number of Msg3 transmission repetitions.

In some optional embodiments, the first indication information is carried in at least one of the following information:

first higher layer signaling, an uplink grant carried by a Random Access Response (RAR), and first Downlink Control Signaling DCI.

In some optional embodiments, the network device 800 further includes:

a fourth sending unit 803 configured to, in response to that the network device does not successfully receive the Msg3 transmission repetitions during running of the contention resolution timer, send second indication information to a terminal device.

In some optional embodiments, the second indication information is carried in a second DCI, and the second DCI is used to schedule the terminal device to perform Msg3 transmission repetitions again.

In some optional embodiments, the number of Msg3 transmission repetitions again can be determined by one of the following information:

the number of Msg3 transmission repetitions which is indicated by the network device last time, second higher layer signaling and the second DCI.

In some optional embodiments, the third processing unit is further configured to:

determine a starting time moment of a random access response window according to a random access occasion corresponding to Msg1 transmission repetitions.

In some optional embodiments, the random access occasion corresponding to Msg1 transmission repetitions includes at least one of the following:

a random access occasion corresponding to each Msg1 transmission repetition; and
a random access occasion corresponding to the last Msg1 transmission repetition.

In some optional embodiments, M transmission repetitions are a second transmission repetition set, and M is a positive integer;

wherein the random access occasion corresponding to the last Msg1 transmission repetition includes: a random access occasion corresponding to the last transmission repetition of the Msg1 of each second transmission repetition set, or a random access occasion corresponding to the last Msg1 transmission repetition of all second transmission repetition sets.

In some optional embodiments, the starting time moment of the random access response window is located at the first symbol in the earliest control resource set after at least one symbol after the last symbol of a random access occasion corresponding to each Msg1 transmission repetition.

In some optional embodiments, the starting time moment of the random access response window is located at the first symbol in the earliest control resource set after at least one symbol after the last symbol of a random access occasion corresponding to the last Msg1 transmission repetition of all second transmission repetition sets;

wherein each second transmission repetition set includes M transmission repetitions, where M is a positive integer.

In some optional embodiments, the starting time moment of the random access response window is located at the first symbol in the earliest control resource set after at least one symbol after the last symbol of a random access occasion corresponding to the last Msg1 transmission repetition of each second transmission repetition set;

wherein each second transmission repetition sets includes M transmission repetitions, where M is a positive integer.

In some optional embodiments, the network device 800 further includes:

a fifth sending unit 804 configured to send third indication information to a terminal device, wherein the third indication information is used to indicate the number of Msg1 transmission repetitions.

In some optional embodiments, the third indication information is carried in at least one of the following information: third higher layer signaling and third DCI.

Figure 17:
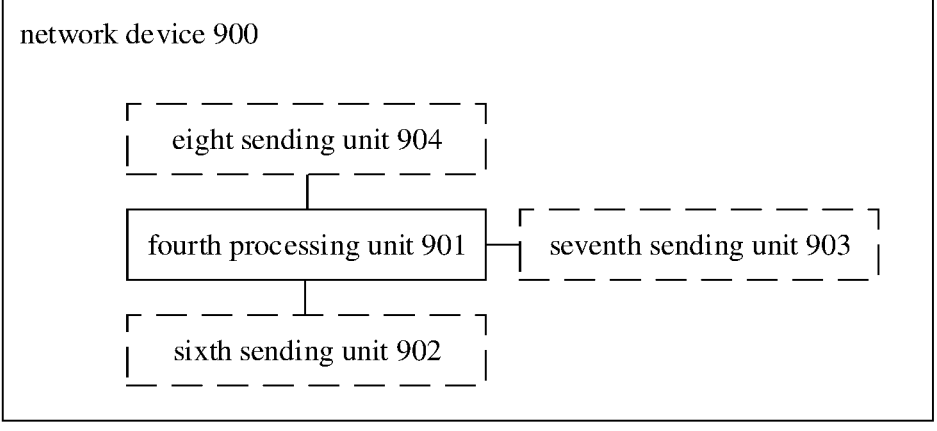
FIG. 17 is a schematic diagram of another optional composition structure of a network device provided by an embodiment of the present disclosure.

In order to implement the random access methods provided in the embodiments of the present disclosure, an embodiment of the present disclosure also provides a network device. Another optional composition structure of the network device 900, as shown in FIG. 17, includes a fourth processing unit 901.

The fourth processing unit 901 is configured to determine a starting time moment of a random access response window according to a random access occasion corresponding to Msg1 transmission repetitions.

In some optional embodiments, the random access occasion corresponding to the Msg1 transmission repetitions includes at least one of the following:

a random access occasion corresponding to each Msg1 transmission repetition; and a random access occasion corresponding to the last Msg1 transmission repetition.

In some optional embodiments, M transmission repetitions are a second transmission repetition set, and M is a positive integer;

wherein the random access occasion corresponding to the last Msg1 transmission repetition includes: a random access occasion corresponding to the last Msg1 transmission repetition of each second transmission repetition set, or a random access occasion corresponding to the last Msg1 transmission repetition of all second transmission repetition sets.

In some optional embodiments, the starting time moment of the random access response window is located at the first symbol in the earliest control resource set after at least one symbol after the last symbol of a random access occasion corresponding to each Msg1 transmission repetition.

In some optional embodiments, the starting time moment of the random access response window is located at the first symbol in the earliest control resource set after at least one symbol after the last symbol of a random access occasion corresponding to the last Msg1 transmission repetition of all second transmission repetition sets;

wherein each second transmission repetition set includes M transmission repetitions, where M is a positive integer.

In some optional embodiments, the starting time moment of the random access response window is located at the first symbol in the earliest control resource set after at least one symbol after the last symbol of a random access occasion corresponding to the last Msg1 transmission repetition of each second transmission repetition set;

wherein each second transmission repetition sets includes M transmission repetitions, where M is a positive integer.

In some optional embodiments, the network device 900 further includes:

a sixth sending unit 902 configured to send third indication information to a terminal device, wherein the third indication information is used to indicate the number of Msg1 transmission repetitions.

In some optional embodiments, the third indication information is carried in at least one of the following information: third higher layer signaling and third Downlink Control Signaling DCI.

In some optional embodiments, the fourth processing unit 901 is configured to, in response to that the terminal device receives a Physical Downlink Shared Channel (PDSCH) carrying Msg2 and/or a Physical Downlink Control Channel (PDCCH) scheduling the PDSCH within the random access response window, stop Msg1 transmission repetitions.

In some optional embodiments, the fourth processing unit 901 is further configured to:

determine a starting time moment of a contention resolution timer according to a time of Msg3 transmission repetitions.

In some optional embodiments, the time of the Msg3 transmission repetitions includes at least one of the following:

a time of each Msg3 transmission repetition; and a time of the last Msg3 transmission repetition.

In some optional embodiments, N transmission repetitions indicated by the network device each time are a first transmission repetition set;

wherein the time of the last Msg3 transmission repetition includes: a time of the last Msg3 transmission repetition of each first transmission repetition set, or a time of the last Msg3 transmission repetition of all first transmission repetition sets.

In some optional embodiments, the starting time moment of the contention resolution timer is located at the first symbol after each Msg3 transmission repetition.

In some optional embodiments, the starting time moment of the contention resolution timer is located at the first symbol after the last Msg3 transmission repetition of all first transmission repetition sets;

wherein the first transmission repetition set includes N transmission repetitions indicated by a network device each time, where N is a positive integer.

In some optional embodiments, the starting time moment of the contention resolution timer is located at the first symbol after the last Msg3 transmission repetition of each first transmission repetition set;

wherein the first transmission repetition set includes N transmission repetitions indicated by a network device each time, where N is a positive integer.

In some optional embodiments, the network device 900 further includes:

a seventh sending unit 903 configured to send first indication information to a terminal device, wherein the first indication information is used to indicate the number of Msg3 transmission repetitions.

In some optional embodiments, the first indication information is carried in at least one of the following information:

first higher layer signaling, an uplink grant carried by a Random Access Response (RAR), and first DCI.

In some optional embodiments, the network device 900 further includes:

an eighth sending unit 904 configured to, in response to that a network device does not successfully receive the Msg3 transmission repetitions during running of the contention resolution timer, send second indication information to the terminal device.

In some optional embodiments, the second indication information is carried in a second DCI, and the second DCI is used to schedule the terminal device to perform Msg3 transmission repetitions again.

In some optional embodiments, the number of Msg3 transmission repetitions again can be determined by one of the following information:

the number of Msg3 transmission repetitions which is indicated by the network device last time, second higher layer signaling and the second DCI.

It should be noted that the functions of the sending unit involved in the embodiments of the present disclosure may be realized by a sender, or a transmitter, or a transceiver; the functions of the receiving unit involved in the embodiments of the present disclosure may be realized by a receiver or a transceiver. The functions of the processing unit involved in the embodiments of the present disclosure may be implemented by a processor.

An embodiment of the present disclosure further provides a terminal device, including a processor and a memory for storing a computer program that can be run on the processor, wherein the processor is configured to, when the computer programs are run, perform steps of a random access method performed by the terminal device.

An embodiment of the present disclosure also provides a network device, including a processor and a memory for storing a computer program that can run on the processor, wherein the processor is configured to, when the computer programs are run, perform steps of a random access method performed by the network device.

An embodiment of the present disclosure further provides a chip, including: a processor configured to call and run a computer program from a memory, so that a device in which the chip is installed performs the random access method performed by the above-mentioned terminal device.

An embodiment of the present disclosure further provides a chip, including: a processor configured to call and run a computer program from a memory, so that a device in which the chip is installed performs the random access method performed by the above-mentioned network device.

An embodiment of the present disclosure further provides a storage medium, which stores an executable program, and when the executable program is executed by a processor, the processor is caused to implement the above random access method performed by the terminal device.

An embodiment of the present disclosure further provides a storage medium, which stores an executable program, and when the executable program is executed by a processor, the processor is caused to implement the above random access method performed by the network device.

An embodiment of the present disclosure further provides a computer program product, including computer program instructions, where the computer program instructions cause a computer to perform the random access method performed by the above-mentioned terminal device.

An embodiment of the present disclosure further provides a computer program product, including computer program instructions, where the computer program instructions cause a computer to perform the random access method performed by the foregoing network device.

An embodiment of the present disclosure further provides a computer program, where the computer program causes a computer to perform the random access method executed by the above-mentioned terminal device.

An embodiment of the present disclosure further provides a computer program, where the computer program causes a computer to perform the random access method executed by the above-mentioned network device.

Figure 18:
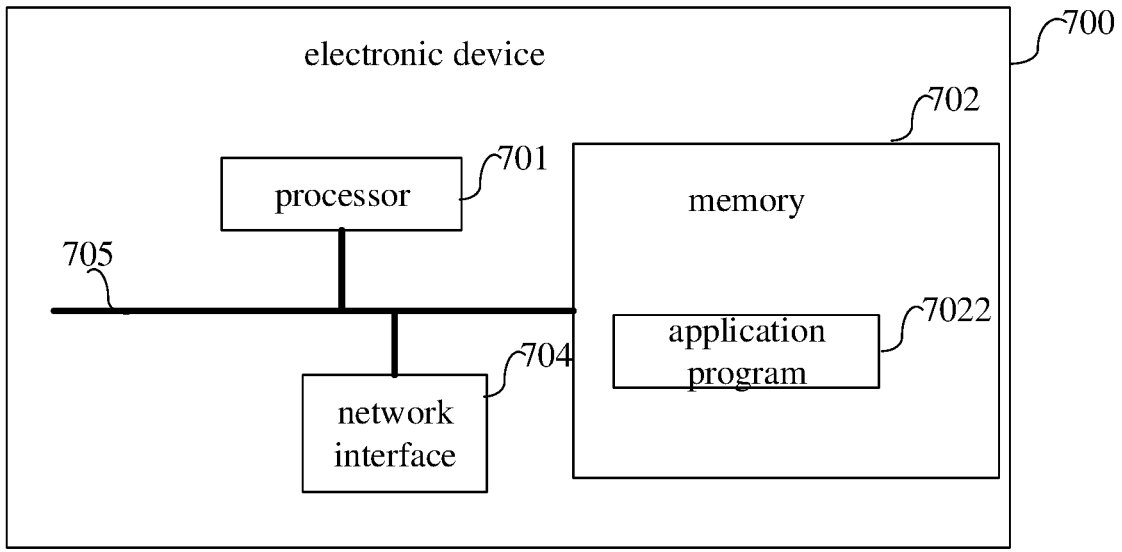
FIG. 18 is a schematic diagram of a hardware composition structure of an electronic device provided by an embodiment of the present disclosure.

FIG. 18 is a schematic diagram of the hardware composition structure of an electronic device (terminal device or network device) according to an embodiment of the present disclosure. The electronic device 700 includes: at least one processor 701, a memory 702 and at least one network interface 704. Various components in the electronic device 700 are coupled together through a bus system 705. It can be understood that the bus system 705 is used to realize connections and communications between these components. In addition to a data bus, the bus system 705 also includes a power bus, a control bus and a status signal bus. However, the various buses are labeled as the bus system 705 in FIG. 18 for clarity of illustration.

It can be understood that the memory 702 may be a volatile memory or a non-volatile memory, and may also include both volatile and non-volatile memories. Among them, the non-volatile memory may be ROM, Programmable Read-Only Memory (PROM), Erasable Programmable Read-Only Memory (EPROM), Electrically Erasable Programmable read-only memory (EEPROM), Ferromagnetic Random Access Memory (FRAM), flash memory, magnetic surface storage, optical disc, or Compact Disc Read-Only Memory (CD-ROM); the magnetic surface storage may be a disk storage or a tape storage. The volatile memory may be Random Access Memory (RAM), which is used as an external cache. By way of illustration and not limitation, many forms of RAM may be used, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Direct Rambus Random Access Memory (DRRAM). The memory 702 described in the embodiments of the present disclosure is intended to include but not limited to these and any other suitable types of memory.

The memory 702 in the embodiments of the present disclosure is used to store various types of data to support the operation of the electronic device 700. Examples of such data include: any computer programs for operations on the electronic device 700, such as application program 7022. The program for implementing the methods of the embodiments of the present disclosure may be included in the application program 7022.

The methods disclosed in the foregoing embodiments of the present disclosure may be applied to the processor 701 or implemented by the processor 701. The processor 701 may be an integrated circuit chip with signal processing capabilities. In the implementations, each step of the above methods may be completed by an integrated logic circuit of hardware in the processor 701 or instructions in the form of software. The aforementioned processor 701 may be a general-purpose processor, a digital signal processor (DSP), or other programmable logic devices, discrete gate or transistor logic devices, discrete hardware components, and the like. The processor 701 may implement or execute various methods, steps, and logic block diagrams disclosed in the embodiments of the present disclosure. A general purpose processor may be a microprocessor or any conventional processor or the like. The steps of the methods disclosed in the embodiments of the present disclosure may be directly embodied as being implemented by a hardware decoding processor, or implemented by a combination of hardware and software modules in the decoding processor. The software modules may be located in a storage medium, and the storage medium is located in the memory 702. The processor 701 reads the information in the memory 702, and completes the steps of the foregoing methods in combination with its hardware.

In an exemplary embodiment, the electronic device 700 may be implemented by one or more Application Specific Integrated Circuits (ASIC), DSPs, Programmable Logic Devices (PLDs), Complex Programmable Logic Devices (CPLDs), FPGAs, general-purpose processor, controller, MCU, MPU, or other electronic components to implement the aforementioned methods.

The present disclosure is described with reference to flowcharts and/or block diagrams of methods, devices (systems), and computer program products according to embodiments of the present disclosure. It should be understood that each flow and/or block in the flowchart(s) and/or block diagram(s), and a combination of flows and/or blocks in the flowchart(s) and/or block diagram(s) may be realized by computer program instructions. These computer program instructions may be provided to a general purpose computer, special purpose computer, embedded processor, or processor of other programmable data processing equipment to produce a machine such that the instructions executed by the processor of the computer or other programmable data processing equipment produce an apparatus for realizing the functions specified in one or more flows of the flowchart(s) and/or one or more blocks of the block diagram(s).

These computer program instructions may also be stored in a computer-readable memory capable of directing a computer or other programmable data processing device to operate in a specific manner, such that the instructions stored in the computer-readable memory produce an article of manufacture including instruction means, which realizes the function specified in one or more flow of the flowchart(s) and/or one or more blocks of the block diagram(s).

These computer program instructions can also be loaded onto a computer or other programmable data processing device, causing a series of operation steps to be performed on the computer or other programmable device to produce a computer-implemented process, so that the instructions executed on the computer or other programmable device provide steps for implementing the functions specified in one or more flow of the flowchart(s) and/or one or more blocks of the block diagram(s).

It should be understood that the terms "system" and "network" are often used interchangeably herein. The term "and/or" in this application is only an association relationship describing associated objects, which means that there may be three kinds of relationships, for example, A and/or B may mean three situations: A alone, B alone, and A and B together. In addition, the character "/" in this application generally indicates that the objects before and after the character are an "or" relationship.

The above only describes example embodiments of the present disclosure, and is not used to limit the protection scope of the present disclosure. Any modifications, equivalent replacements and improvements made within the spirit and principle of the present disclosure fall within the protection scope of the present disclosure.

What is claimed is:

1. A random access method, comprising:
determining, by a terminal device, a starting time moment of a contention resolution timer according to a time of Msg3 transmission repetitions;
wherein the starting time moment of the contention resolution timer is located at a first symbol after the last Msg3 transmission repetition of all first transmission repetition sets;
wherein one of the first transmission repetition sets comprises N transmission repetitions indicated by a network device each time, where N is a positive integer.
2. The method according to claim 1, wherein the time of the Msg3 transmission repetitions comprises:
a time of the last Msg3 transmission repetition.
3. The method according to claim 2, wherein N transmission repetitions indicated by the network device each time are a first transmission repetition set;
wherein the time of the last Msg3 transmission repetition comprises: a time of the last Msg3 transmission repetition of each first transmission repetition set, or a time of the last Msg3 transmission repetition of all first transmission repetition sets.
4. The method according to claim 1, further comprising:
receiving, by the terminal device, first indication information sent by a network device, wherein the first indication information is used to indicate the number of Msg3 transmission repetitions.
5. The method according to claim 1, further comprising:
in response to that a network device does not successfully receive the Msg3 transmission repetitions during running of the contention resolution timer, receiving, by the terminal device, second indication information.
6. The method according to claim 5, further comprising:
performing, by the terminal device, Msg3 transmission repetitions again based on the second indication information.
7. The method according to claim 6, wherein the number of Msg3 transmission repetitions again is determined by one of:
the number of Msg3 transmission repetitions which is indicated by the network device last time, second higher layer signaling, or a second DCI.
8. The method according to claim 1, further comprising:
determining, by the terminal device, a starting time moment of a random access response window according to a random access occasion corresponding to Msg1 transmission repetitions.
9. The method according to claim 8, wherein in response to that the terminal device receives a Physical Downlink Shared Channel (PDSCH) carrying Msg2 and/or a Physical Downlink Control Channel (PDCCH) scheduling the PDSCH within the random access response window, stopping, by the terminal device, the Msg1 transmission repetitions.
10. A random access method, comprising:
determining, by a network device, a starting time moment of a contention resolution timer according to a time of Msg3 transmission repetitions;

wherein the starting time moment of the contention resolution timer is located at a first symbol after the last Msg3 transmission repetition of all first transmission repetition sets;

wherein one of the first transmission repetition sets comprises N transmission repetitions indicated by the network device each time, where N is a positive integer.

11. The method according to claim 10, wherein the time of the Msg3 transmission repetitions comprises:

a time of the last Msg3 transmission repetition.

12. The method according to claim 11, wherein N transmission repetitions indicated by the network device each time are a first transmission repetition set;

wherein the time of the last Msg3 transmission repetition comprises: a time of the last Msg3 transmission repetition of each first transmission repetition set, or a time of the last Msg3 transmission repetition of all first transmission repetition sets.

13. The method according to claim 10, further comprising:

determining, by the network device, a starting time moment of a random access response window according to a random access occasion corresponding to Msg1 transmission repetitions.

14. The method according to claim 13, wherein the starting time moment of the random access response window is located at a first symbol in the earliest control resource set after at least one symbol after the last symbol of a random access occasion corresponding to the last Msg1 transmission repetition of all second transmission repetition sets;

wherein each second transmission repetition set comprises M transmission repetitions, where M is a positive integer; or wherein the starting time moment of the random access response window is located at the first symbol in the earliest control resource set after at least one symbol after the last symbol of a random access occasion corresponding to the last Msg1 transmission repetition of each second transmission repetition set;

wherein each second transmission repetition sets comprises M transmission repetitions, where M is a positive integer.

15. The method according to claim 13, further comprising:

sending, by the network device, third indication information to a terminal device, wherein the third indication information is used to indicate the number of Msg1 transmission repetitions.

16. A terminal device, comprising:

a processor; and a memory storing instructions executable by the processor;

wherein when the instructions are executed by the processor, the terminal device is caused to:

determine a starting time moment of a contention resolution timer according to a time of Msg3 transmission repetitions;

wherein the starting time moment of the contention resolution timer is located at a first symbol after the last Msg3 transmission repetition of all first transmission repetition sets;

wherein at least one of the first transmission repetition sets comprises N transmission repetitions indicated by a network device each time, where N is a positive integer.

17. The terminal device according to claim 16, wherein the time of the Msg3 transmission repetitions comprises:

a time of the last Msg3 transmission repetition.

18. The terminal device according to claim 17, wherein N transmission repetitions indicated by the network device each time are a first transmission repetition set;

wherein the time of the last Msg3 transmission repetition comprises: a time of the last Msg3 transmission repetition of each first transmission repetition set, or a time of the last Msg3 transmission repetition of all first transmission repetition sets.

19. A network device, comprising:

a processor; and a memory storing instructions executable by the processor;

wherein when the instructions are executed by the processor, the network device is caused to:

determine a starting time moment of a contention resolution timer according to a time of Msg3 transmission repetitions;

wherein the starting time moment of the contention resolution timer is located at a first symbol after the last Msg3 transmission repetition of all first transmission repetition sets;

wherein one of the first transmission repetition sets comprises N transmission repetitions indicated by the network device each time, where N is a positive integer.

20. The network device according to claim 19, wherein the time of the Msg3 transmission repetitions comprises:

a time of the last Msg3 transmission repetition.

* * * * *